(12) United States Patent
Hirose et al.

(10) Patent No.: US 7,984,196 B2
(45) Date of Patent: Jul. 19, 2011

(54) COMMUNICATION APPARATUS AND ITS CONTROL METHOD

(75) Inventors: Takatoshi Hirose, Yokohama (JP); Hidetada Nago, Kawasaki (JP); Kenichi Fujii, Tokyo (JP); Takahiro Shichino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1171 days.

(21) Appl. No.: 11/373,196

(22) Filed: Mar. 13, 2006

(65) Prior Publication Data
US 2006/0242304 A1 Oct. 26, 2006

(30) Foreign Application Priority Data

Mar. 15, 2005 (JP) ................................ 2005-073950

(51) Int. Cl.
G06F 15/16 (2006.01)
(52) U.S. Cl. ........ 709/253; 709/227; 709/249; 710/313; 714/4; 455/557
(58) Field of Classification Search .................. 709/227, 709/228, 229, 249; 710/306; 713/300, 323, 713/324; 455/9, 445; 358/1.14, 1.15
See application file for complete search history.

(56) References Cited

U.S. PATENT DOCUMENTS

| | | | | |
|---|---|---|---|---|
| 5,699,511 A | * | 12/1997 | Porcaro et al. | 714/55 |
| 5,708,820 A | * | 1/1998 | Park et al. | 713/323 |
| 5,754,752 A | * | 5/1998 | Sheh et al. | 714/4.4 |
| 6,038,225 A | | 3/2000 | Nago | 370/343 |
| 6,141,719 A | | 10/2000 | Rafferty et al. | 710/131 |
| 6,157,465 A | | 12/2000 | Suda et al. | 358/407 |
| 6,205,502 B1 | | 3/2001 | Endo et al. | 710/100 |
| 6,477,570 B1 | * | 11/2002 | Takayama et al. | 709/224 |
| 6,529,522 B1 | | 3/2003 | Ito et al. | 370/466 |
| 6,560,662 B1 | * | 5/2003 | Sakai | 710/104 |
| 6,603,744 B2 | | 8/2003 | Mizutani et al. | 370/310 |
| 6,697,618 B1 | * | 2/2004 | Bullock et al. | 455/427 |
| 6,756,898 B2 | | 6/2004 | Ikematsu | 340/531 |
| 6,839,344 B1 | * | 1/2005 | Couillaud et al. | 370/353 |
| 6,912,651 B1 | | 6/2005 | Hamdi et al. | 713/1 |
| 7,010,638 B2 | | 3/2006 | Deng et al. | 710/306 |
| 7,024,501 B1 | | 4/2006 | Wright | 710/72 |
| 7,151,949 B2 | | 12/2006 | Cavill et al. | 455/556.1 |

(Continued)

FOREIGN PATENT DOCUMENTS

CN 1132381 12/2003

(Continued)

OTHER PUBLICATIONS

Bigioi et al.; PTP/IP—A New Transport Specification for Wireless Photography; Jan. 14, 2005.*

(Continued)

*Primary Examiner* — Rupal D Dharia
*Assistant Examiner* — Jimmy H Tran
(74) *Attorney, Agent, or Firm* — Fitzpatrick, Cella, Harper & Scinto

(57) ABSTRACT

A wireless communication apparatus recognizes whether an information input apparatus is in a wirelessly communicable state at periods shorter than a disconnection waiting time in an information transfer protocol which transfers information between the information input apparatus and an information output apparatus. If the wireless communication apparatus recognizes that the information input apparatus is not in the wireless communicable state, it permits and expedites processing of a request for connection with the information output apparatus sent from another information input apparatus over a wireless network.

17 Claims, 7 Drawing Sheets

U.S. PATENT DOCUMENTS

| | | | |
|---|---|---|---|
| 7,162,555 B2 * | 1/2007 | Kim et al. | 710/105 |
| 7,200,685 B2 | 4/2007 | Uemura | 710/2 |
| 7,207,059 B1 * | 4/2007 | Kurian et al. | 726/9 |
| 7,233,408 B2 | 6/2007 | Henderson et al. | 358/1.15 |
| 7,353,391 B2 | 4/2008 | Sato et al. | 713/169 |
| 7,373,434 B2 | 5/2008 | Yoshida et al. | 710/14 |
| 7,428,209 B1 * | 9/2008 | Roberts | 370/217 |
| 7,453,880 B2 | 11/2008 | Tanaka | 370/395 |
| 7,689,223 B1 * | 3/2010 | Lewis | 455/445 |
| 7,831,282 B2 * | 11/2010 | Luebke et al. | 455/574 |
| 2001/0009018 A1 * | 7/2001 | Iizuka | 710/11 |
| 2002/0132603 A1 * | 9/2002 | Lindskog et al. | 455/343 |
| 2002/0147816 A1 * | 10/2002 | Hlasny | 709/227 |
| 2002/0166080 A1 * | 11/2002 | Attanasio et al. | 714/15 |
| 2002/0196769 A1 * | 12/2002 | Ohmi et al. | 370/343 |
| 2003/0012132 A1 * | 1/2003 | Novaes | 370/225 |
| 2003/0086388 A1 * | 5/2003 | Peters et al. | 370/328 |
| 2003/0110319 A1 * | 6/2003 | Kim et al. | 710/1 |
| 2003/0195983 A1 * | 10/2003 | Krause | 709/238 |
| 2003/0224820 A1 * | 12/2003 | Einola et al. | 455/554.1 |
| 2004/0088449 A1 * | 5/2004 | Sakaki | 710/15 |
| 2004/0122649 A1 | 6/2004 | Bartek et al. | 703/23 |
| 2004/0218204 A1 * | 11/2004 | Nomura | 358/1.14 |
| 2004/0218209 A1 * | 11/2004 | Hamaguchi et al. | 358/1.15 |
| 2004/0223180 A1 | 11/2004 | Brooks | 358/1.15 |
| 2004/0260745 A1 * | 12/2004 | Gage et al. | 709/200 |
| 2004/0266386 A1 * | 12/2004 | Kuo | 455/343.1 |
| 2005/0048953 A1 * | 3/2005 | Ohara | 455/412.1 |
| 2005/0052690 A1 * | 3/2005 | Masumoto et al. | 358/1.15 |
| 2005/0059386 A1 * | 3/2005 | Li | 455/420 |
| 2005/0060419 A1 | 3/2005 | Fujii et al. | 709/230 |
| 2005/0066197 A1 | 3/2005 | Hirata et al. | 713/201 |
| 2005/0088689 A1 | 4/2005 | Suga et al. | 358/1.15 |
| 2005/0091437 A1 | 4/2005 | Yang et al. | 710/313 |
| 2005/0194446 A1 * | 9/2005 | Wiklof et al. | 235/462.46 |
| 2005/0197093 A1 * | 9/2005 | Wiklof et al. | 455/343.1 |
| 2005/0289257 A1 * | 12/2005 | Fink | 710/62 |
| 2006/0020723 A1 | 1/2006 | Chia-Chun | 710/62 |
| 2006/0161793 A1 * | 7/2006 | Orr | 713/300 |
| 2006/0200563 A1 | 9/2006 | Hirose | 709/227 |
| 2006/0200564 A1 | 9/2006 | Watanabe et al. | 709/227 |
| 2006/0206592 A1 | 9/2006 | Fujii et al. | 709/220 |
| 2006/0246946 A1 | 11/2006 | Moritomo et al. | 455/557 |
| 2006/0246947 A1 | 11/2006 | Fujii et al. | 455/557 |
| 2006/0248581 A1 * | 11/2006 | Sundarrajan et al. | 726/12 |
| 2006/0253605 A1 * | 11/2006 | Sundarrajan et al. | 709/238 |
| 2006/0268744 A1 | 11/2006 | Sakai et al. | 370/254 |
| 2007/0002867 A1 | 1/2007 | Shitano et al. | 370/395.5 |
| 2007/0230393 A1 * | 10/2007 | Sinha et al. | 370/328 |

FOREIGN PATENT DOCUMENTS

| | | |
|---|---|---|
| EP | 0 169 244 B1 | 7/1991 |
| JP | 9-153897 | 6/1997 |
| JP | A 10-257119 | 9/1998 |
| JP | 11-239312 | 8/1999 |
| JP | 2000-209238 A | 7/2000 |
| JP | A 2002-118577 | 4/2002 |
| JP | 2002-202835 A | 7/2002 |
| JP | A 2003-087276 | 3/2003 |
| JP | A 2003-110585 | 4/2003 |
| JP | U 3094734 | 7/2003 |
| JP | 2003-263253 A | 9/2003 |
| JP | 2004-005541 A | 1/2004 |
| JP | A 2004-009388 | 1/2004 |
| JP | B 3530847 | 5/2004 |
| JP | A 2004-171158 | 6/2004 |
| JP | A 2005-011246 | 1/2005 |
| JP | A 2005-044094 | 2/2005 |
| KR | 1985-7000172 | 10/1985 |
| KR | 10-2005-0102824 | 10/2005 |
| KR | 10-2005-0119407 | 12/2005 |
| KR | 10-2006-0079516 | 7/2006 |
| WO | WO 00/42740 | 7/2000 |
| WO | WO 01/48613 A2 | 7/2001 |
| WO | WO 03/052606 A1 | 6/2003 |

OTHER PUBLICATIONS

ISO 15740; Photography—Electronic still picture imaging—Picture transfer protocol (PTP) for digital still photography devices; First edition; Aug. 8, 2005.*

Korean Notice of Allowance dated Dec. 12, 2007, regarding Application No. 9-5-2007-067399399.

European Search Report for Application No. EP 06 25 1335, dated Aug. 1, 2006.

Axis Communications AB: Axis 5810—A Bluetooth Print Plug [Online] 2002, pp. 1-2, XP002389023.

Fotonation: "Fotonation Printer Dongle" [Online] 2006, pp. 1-2, XP002389024.

Office Action dated Feb. 20, 2007, issued in Korean counterpart application.

Mobile Printing—Today and in the Future, White Paper Axis Communications, Network Print Servers, Ref: 1.1, last updated Feb. 5, 2001, pp. 1-10.

* cited by examiner

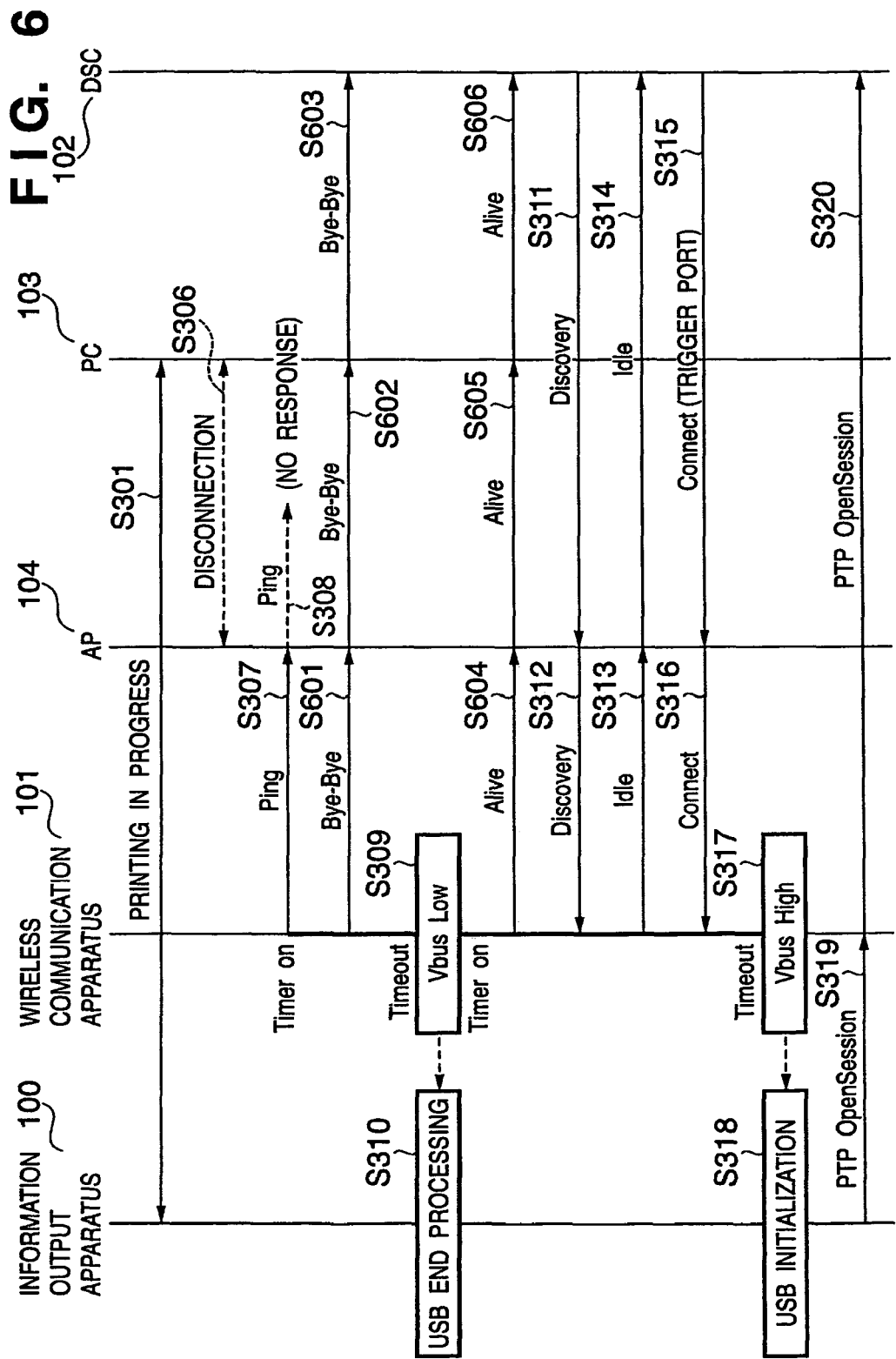

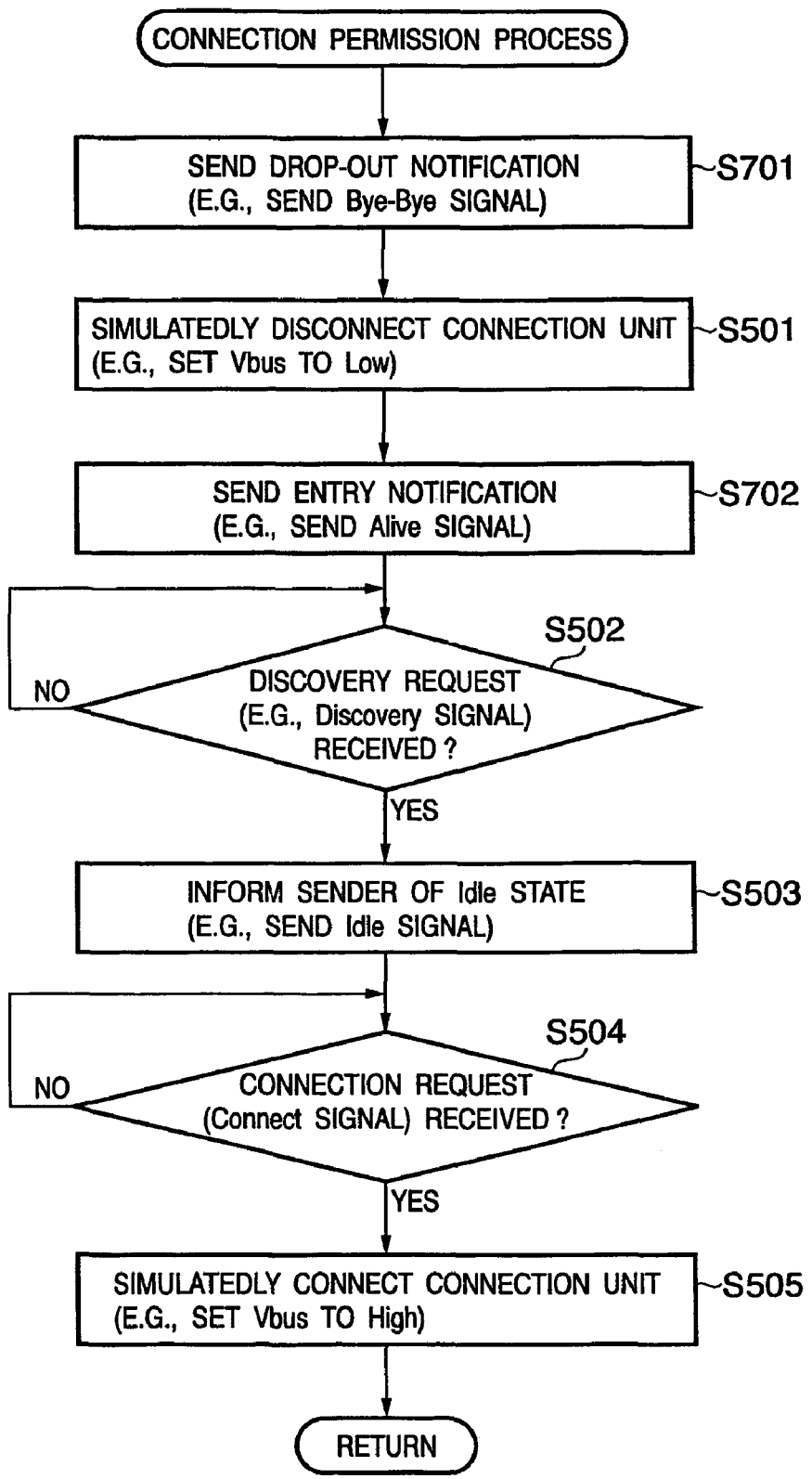

COMMUNICATION APPARATUS AND ITS CONTROL METHOD

FIELD OF THE INVENTION

The present invention relates to a technique for aiding an information processing apparatus in network communication.

BACKGROUND OF THE INVENTION

To output information (image data or the like) input in an information input apparatus (digital camera or the like) from an information output apparatus (printer or the like), it has conventionally been necessary to temporarily store the image data in a personal computer (PC).

In recent years, digital camera users who do not possess PCs have been increasing. Also users who want to print images stored in a digital camera more easily have been increasing. Under the circumstances, to meet the needs of such users, a "direct print" method has been proposed, i.e., a method of directly connecting a digital camera and a printer by a cable to perform printing (Japanese Patent Laid-Open No. 11-239312).

If a wireless network replaces a connection cable in a direct print method described above, users will feel more convenient.

However, wireless communication may be disconnected due to the surrounding environment or the like, unlike wire communication. A higher level information transfer protocol for implementing wireless direct printing does not define a solution for a wireless-specific error such as disconnection of a wireless channel. More specifically, in such a higher level information transfer protocol, "disconnection of a wireless channel" is treated as a "data delay".

However, a timer for monitoring detection of a "data delay" is set to time out after a relatively long time (e.g., 2 minutes). For this reason, other image input apparatuses need to wait until the timer times out.

SUMMARY OF THE INVENTION

The present invention includes, for example, a connection unit for connection with an information processing apparatus and a communication unit for communicating with a communication partner of the information processing apparatus over a network. The present invention particularly includes a confirmation unit for confirming a state of communication with the communication partner and a change unit for changing a state of connection with the information processing apparatus to a quasi-disconnection state depending on a confirmation result obtained by the confirmation unit.

According to the present invention, restoration of an information processing apparatus in a network can be performed quickly.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is an exemplary sequence chart showing another wireless communication sequence according to an embodiment; and FIG. 7 is an exemplary flowchart showing another connection permission process according to the embodiment.

DETAILED DESCRIPTION OF THE PREFERRED EMBODIMENTS

Preferred embodiments of the present invention will now be described in detail in accordance with the accompanying drawings.

First Embodiment

Figure 1:
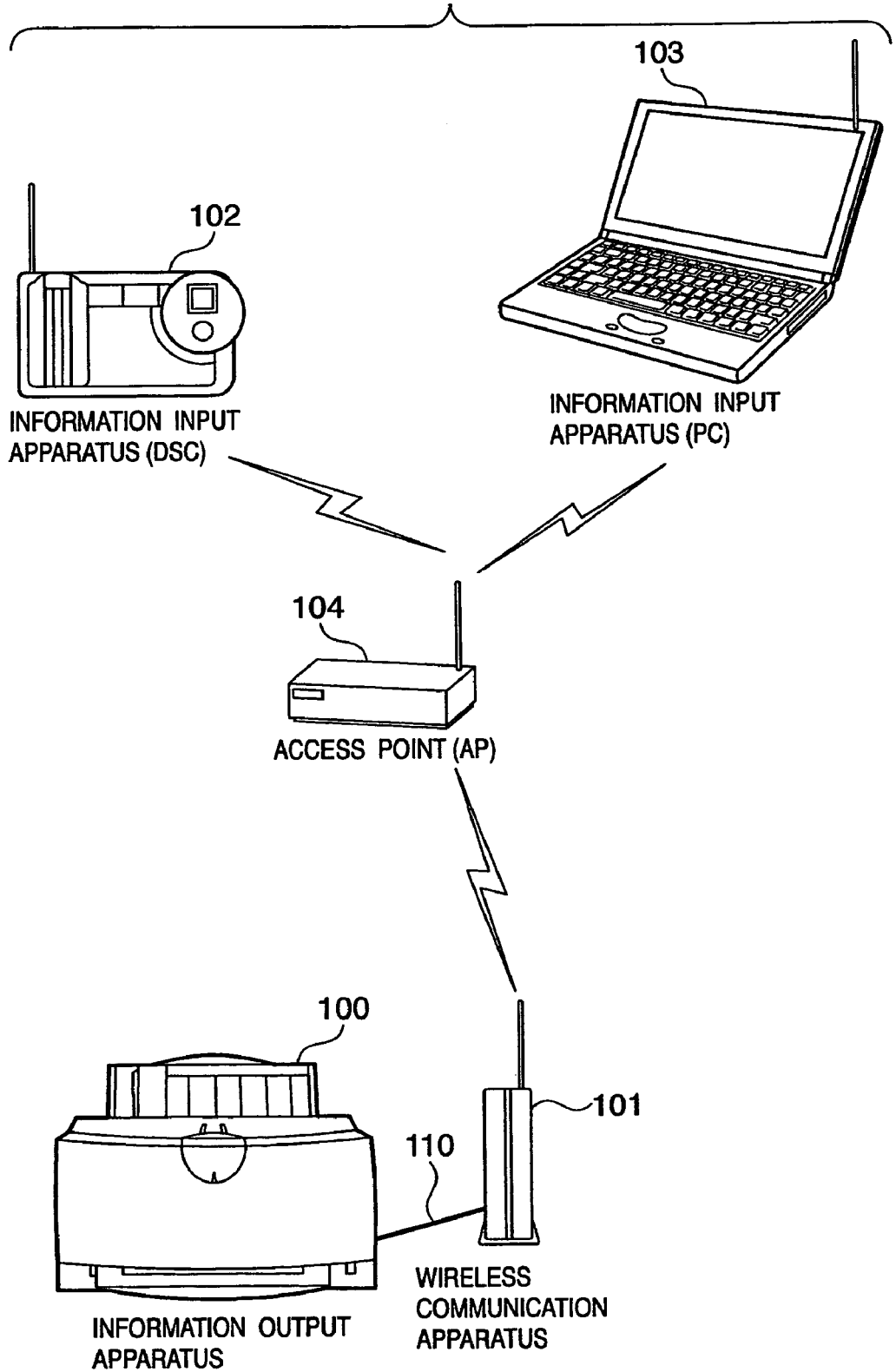
FIG. 1 is a view showing an example of a wireless communication system according to an embodiment.

FIG. 1 is a view showing an example of a wireless communication system according to an embodiment. This embodiment will be explained using an information output apparatus (an image output apparatus such as a printer, copying machine, or multifunction machine, a display apparatus, or the like) 100 as an example of an external apparatus. The information output apparatus 100 is connected to a wireless communication apparatus 101 by a USB (Universal Serial Bus) cable or the like.

The wireless communication apparatus 101 performs communication based on IEEE802.11x typified by IEEE802.11a/b/g or the like. With this wireless communication, the wireless communication apparatus 101 connects with a first information input apparatus 102 (e.g., a digital camera (DSC) or the like) and a second information input apparatus (e.g., a personal computer (PC) or the like) 103 at least over a wireless network. In the example of FIG. 1, an infrastructure network in which an access point 104 intervenes among the apparatuses is shown. Alternatively, An ad hoc network without the access point 104 may be adopted. Each of the information input apparatuses 102 and 103, of course, is equipped with wireless communication equipment for connecting to the wireless network. As described above, the wireless communication apparatus 101 functions as a wireless adaptor device (e.g., a media converter, dongle, or the like) for connecting the information output apparatus 100 to the wireless network.

In this embodiment, the wireless communication apparatus 101 and the information input apparatus 102 or 103 perform wireless direct printing using PTP/IP as a higher level information transfer protocol. PTP/IP is an abbreviation for Picture Transfer Protocol over Internet Protocol.

Figure 2:
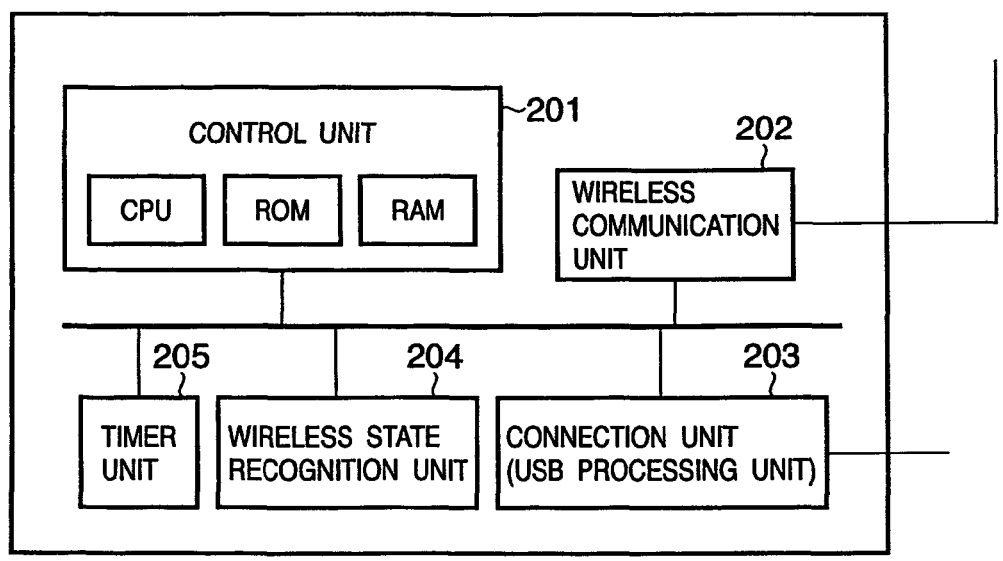
FIG. 2 is an exemplary block diagram of a wireless communication apparatus according to the embodiment.

FIG. 2 is an exemplary block diagram of the wireless communication apparatus according to the embodiment. A control unit 201 is a control circuit or component which controls various units in the wireless communication apparatus 101 and includes a CPU, a ROM storing programs for the control unit, a RAM which functions as a work area, and the like. A wireless communication unit 202 is a circuit or component for sending or receiving a wireless signal to or from a wireless communication network. A connection unit 203 is an interface circuit or component for connection with the information output apparatus 100. Examples of the connection unit 203 include a USB host processing circuit.

A wireless state recognition unit 204 is a circuit or component for recognizing whether a communication partner apparatus (e.g., the information input apparatus 102 or 103 or the like) with which the wireless communication apparatus 101 is wirelessly connecting is in a communicable state. That is, the wireless state recognition unit 204 functions as confirmation unit for confirming the state of communication with the communication partner apparatus. For example, the wireless state recognition unit 204 confirms the state of communication of the communication partner apparatus by sending a Ping signal or the like to the communication partner apparatus. Note that the functions of the wireless state recognition unit 204 may be implemented by the control unit 201.

A timer unit 205 is a so-called timer circuit and is used to, e.g., measure or count a period of time at which the wireless state recognition unit 204 operates (period at which a Ping signal is sent). As described above, the wireless state recognition unit 204 confirms the state of communication with the communication partner apparatus at intervals shorter than a data delay time-out period defined in the information transfer protocol.

The control unit 201 also functions as change unit for changing the state of connection with the information output apparatus 100 to a quasi-disconnection state depending on the confirmation result. The quasi-disconnection state is a state in which the wireless communication apparatus 101 still physically connects to the information output apparatus 100, but in which the information output apparatus 100 detects the connection to have been broken. The control unit 201 further functions as management unit for managing the information output apparatus 100 as a non-communicating state depending on the confirmation result.

Figure 3:
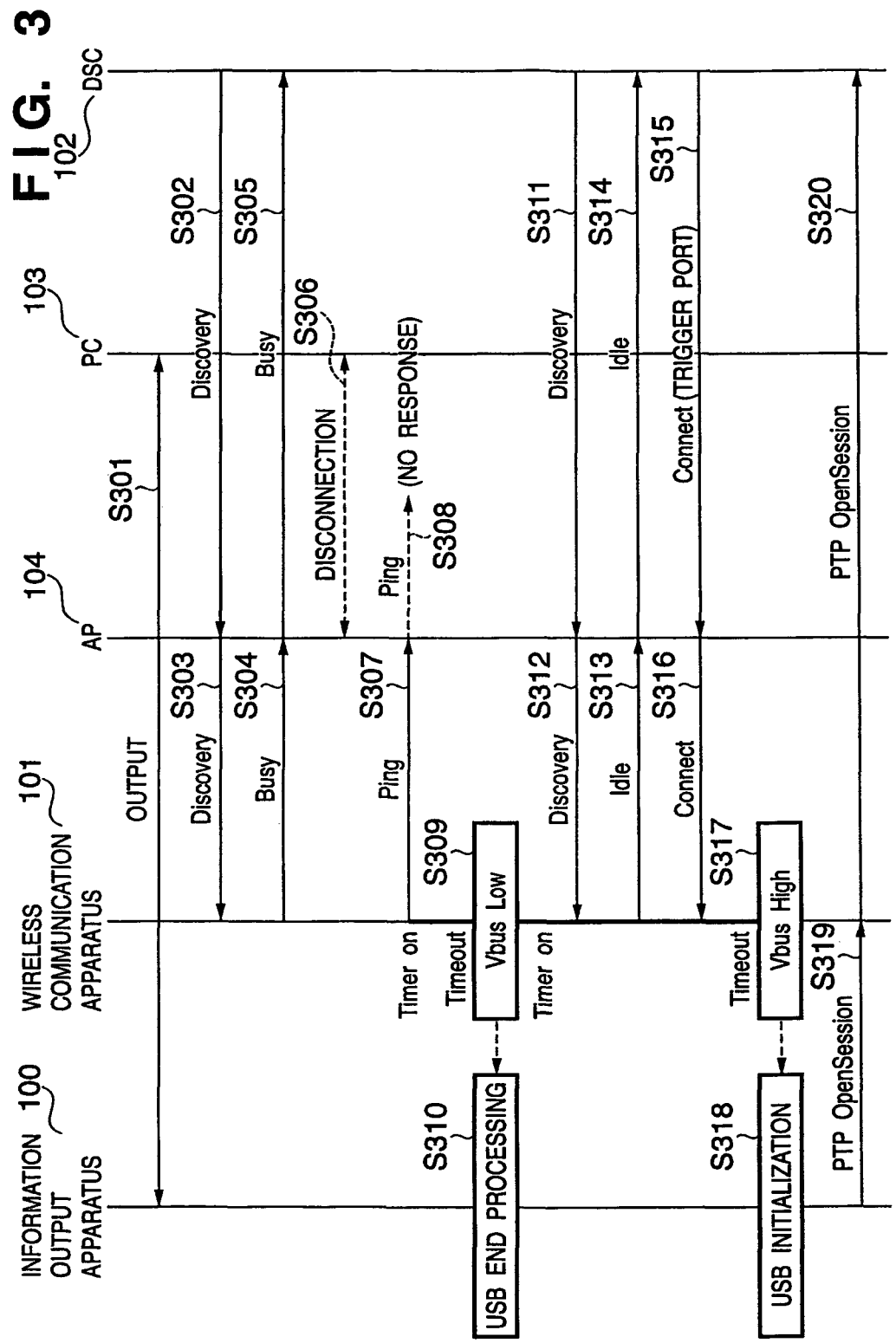
FIG. 3 is an exemplary sequence chart showing a wireless communication sequence according to the embodiment.

FIG. 3 is an exemplary sequence chart of wireless communication according to the embodiment. Note that this example assumes a case where when performing the process of outputting information sent from the second information input apparatus (PC) 103, the information output apparatus 100 falls into a state in which communication with the PC 103 is disconnected.

In S301 of the sequence, the information output apparatus 100 is performing the process of outputting information accumulated in the second information input apparatus (to be referred to as a PC hereinafter) 103 by communicating with the PC 103. PTP/IP is used as an information transfer protocol at this time.

In S302 of the sequence, the first information input apparatus (DSC) 102 first sends a discovery request for the information output apparatus 100 (wireless communication apparatus 101) in order to send an information output request such as a print request to the information output apparatus 100. Examples of a discovery request include a Discovery signal prescribed in a direct printing procedure.

In S303 of the sequence, the access point 104 transfers the discovery request received from the DSC 102 to the wireless communication apparatus 101.

In S304 of the sequence, upon receipt of the discovery request, the wireless communication apparatus 101 connecting with the information output apparatus 100 to be discovered determines whether the information output apparatus 100 is in the middle of output processing. Since PTP/IP is in operation (i.e., output processing is in progress) between the information output apparatus 100 and the PC 103, the wireless communication apparatus 101 unicasts a Busy signal indicating that output processing is in progress. On the other hand, if output processing is not in progress, the wireless communication apparatus 101 sends an Idle signal indicating that the information output apparatus 100 is ready for use.

In S305 of the sequence, the access point 104 transfers the Busy signal to the DSC 102.

In S306 of the sequence, it is assumed that wireless connection is disconnected between the access point 104 and the PC 103 for some reason such as a marked deterioration in surrounding wireless environment.

In S307 of the sequence, the wireless communication apparatus 101 sends a Ping signal to confirm and recognize the communication state of the PC 103.

In S308 of the sequence, the access point 104 transfers the Ping signal toward the PC 103.

Note that the wireless state recognition unit 204 starts counting a period of predetermined duration using the timer unit 205 when PTP/IP is activated between the information output apparatus 100 and the PC 103. The wireless state recognition unit 204 sends a Ping signal using ICMP to the PC 103 in accordance with the Ping program at the end of the period of predetermined duration. The wireless state recognition unit 204 determines whether the PC 103 sends back a response signal to the Ping signal within a predetermined time. The wireless state recognition unit 204 recognizes on the basis of the determination result whether the PC 103 is in a communicable state. Note that ICMP is an abbreviation for Internet Control Message Protocol. The period of predetermined duration is set to be shorter than a time-out period related to a data delay defined in the higher level transfer protocol (PTP/IP or the like). This aims at reducing the waiting time of the other information input apparatus 102.

In S309 of the sequence, since the wireless state recognition unit 204 of the wireless communication apparatus 101 has received no response from the PC 103 within the predetermined time, it determines that the PC 103 is not in the communicable state. Upon receipt of the determination result from the wireless state recognition unit 204, the control unit 201 starts error processing. The control unit 201 changes an internal status to Idle and sets Vbus serving as a USB interface signal line to Low using the connection unit 203.

The state of Vbus will be explained here. When the state of Vbus is High, a USB host interface determines that a USB device is inserted. On the other hand, when the state of Vbus is low, the USB interface determines that the USB device is pulled out. That is, the wireless communication apparatus 101 causes the USB host interface of the information output apparatus 100 to recognize that a USB device is simulatedly pulled out by setting Vbus to Low. Note that the USB host interface need not differentiate between quasi-pullout and actual pullout.

In S310 of the sequence, the USB host interface recognizes from the Low state of Vbus that a USB device has been pulled out and performs USB end processing. Note that the control unit 201 may change the processing depending on the progress of PTP/IP communication. For example, we may assume that the information output apparatus 100 is a printer. In this case, if the information output apparatus 100 has received all data necessary for printing processing, the control unit 201 may perform the USB end processing upon completion of the printing processing.

In S311 of the sequence, the DSC 102 first multicasts a Discovery signal to send an information output request (e.g., a print request or the like) to the information output apparatus 100.

In S312 of the sequence, the access point 104 transfers the Discovery signal to the wireless communication apparatus 101.

In S313 of the sequence, the wireless communication apparatus 101 unicasts an Idle signal toward the DSC 102. An Idle signal is a signal indicating that the information output apparatus 100 is in a state capable of outputting information.

In S314 of the sequence, the access point 104 transfers the Idle signal to the DSC 102.

In S315 of the sequence, upon receipt of the Idle signal, the DSC 102 reads out information on a trigger port of the information output apparatus 100 and the like from the Idle signal and sends a Connect signal to the trigger port.

In S316 of the sequence, the access point 104 transfers the Connect signal to the wireless communication apparatus 101.

In S317 of the sequence, upon receipt of the Connect signal, the wireless communication apparatus 101 changes the state of Vbus to High. This causes the USB host interface of the information output apparatus 100 to recognize quasi-connection of a USB device.

In S318 of the sequence, upon recognition of the quasi-connection of the USB device, the information output apparatus 100 performs initialization of the USB device.

In S319 of the sequence, upon completion of the initialization of the USB device, the information output apparatus 100 activates PTP/IP and sends a PTP OpenSession signal.

In S320 of the sequence, the wireless communication apparatus 101 transfers the PTP OpenSession signal toward the DSC 102. Note that the wireless communication apparatus 101 changes the internal status to Communicating.

Figure 4:
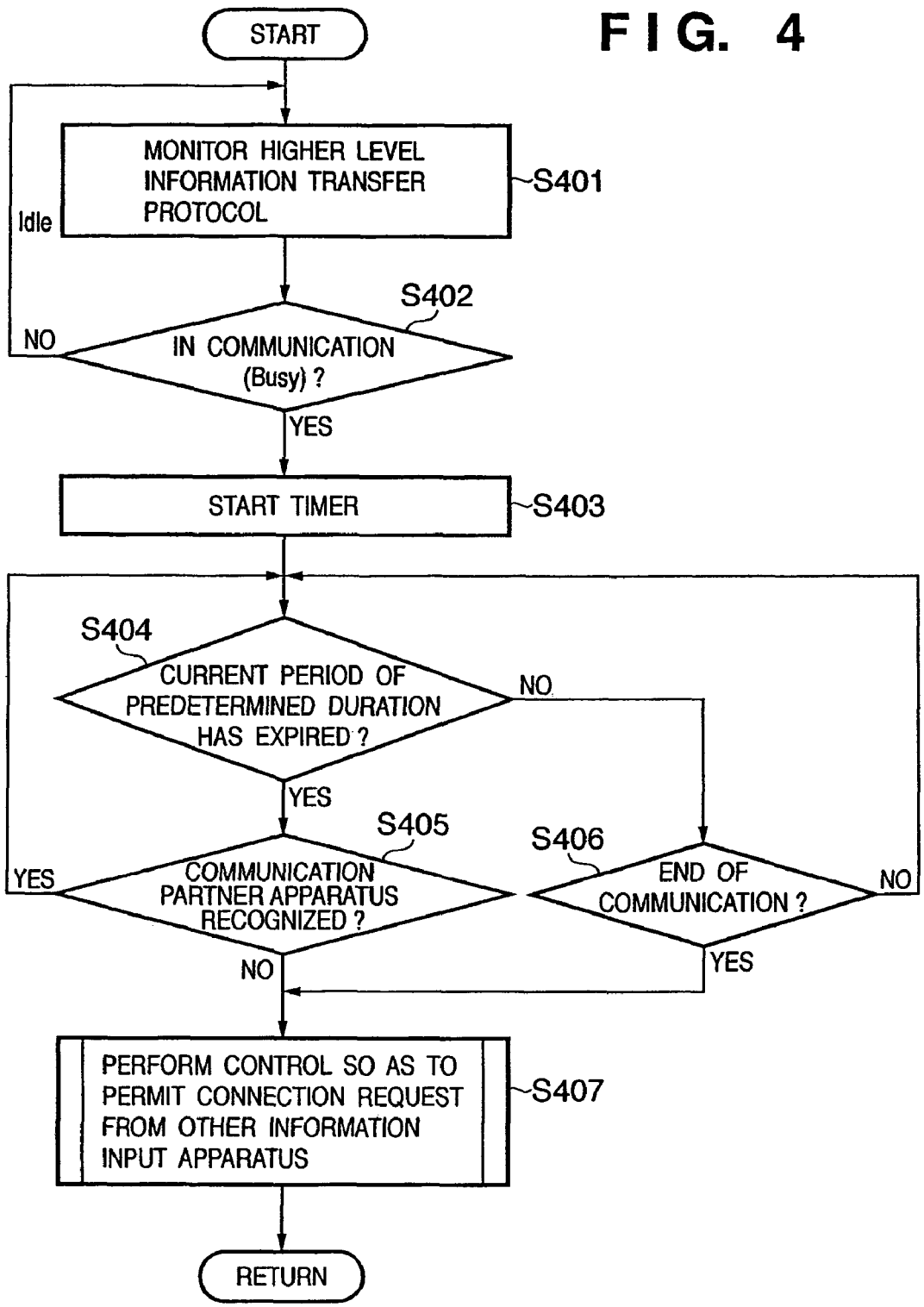
FIG. 4 is an exemplary flowchart showing a control method for the wireless communication apparatus according to the embodiment.

FIG. 4 is an exemplary flowchart showing a control method for the wireless communication apparatus 101 according to the embodiment.

In step S401, the control unit 201 monitors the higher level information transfer protocol (e.g., PTP/IP or the like) through the wireless communication unit 202 or connection unit 203 and acquires information on the communication state.

In step S402, the control unit 201 determines on the basis of the acquired information on the communication state whether the transfer protocol is in communication. More specifically, the control unit 201 determines whether an arbitrary information input apparatus can connect with the information output apparatus 100 or whether the information output apparatus 100 is in the middle of output processing.

If the transfer protocol is not in communication, the flow returns to step S401. On the other hand, if the transfer protocol is in communication, the control unit 201 sets the internal status to Communicating (Busy), and the flow advances to step S403. For example, if a status flag is stored in the RAM, the control unit 201 sets the status flag in the case of Busy and resets the status flag in the case of Idle, thereby managing the internal status. Note that if the control unit 201 receives a discovery request (Discovery signal described above) when the transfer protocol is in communication, it sends in return a Busy signal through the wireless communication unit 202.

In step S403, the control unit 201 starts counting periods of predetermined duration using the timer unit 205. Periods of predetermined duration are used to regularly send a confirmation signal (Ping signal or the like) to the information input apparatus 103 communicating with the information output apparatus 100.

In step S404, the control unit 201 determines whether the current period of the predetermined duration has expired. If the current period of the predetermined duration has expired, the flow advances to step S405. On the other hand, if the current period of the predetermined duration has not expired, the flow advances to step S406. In step S406, the control unit 201 determines whether the communication between the information output apparatus 100 and the information input apparatus 103 has ended. If the communication has ended, the flow advances to step S407; otherwise, the flow returns to step S404.

In step S405, the control unit 201 recognizes whether the information input apparatus 103 communicating with the information output apparatus 100 is in the communicable state (e.g., whether a wireless channel is unintentionally disconnected). For example, the control unit 201 sends a confirmation signal (Ping signal or the like) to the information input apparatus 103 and determines whether the wireless communication apparatus 101 has succeeded in receiving a response signal within a predetermined time. Note that the control unit 201 may use the timer unit 205 in order to determine whether the predetermined time has expired or not. If the communication partner apparatus (information input apparatus 103) can be recognized, the flow returns to step S404. On the other hand, if the communication partner apparatus cannot be recognized, the flow advances to step S407.

In step S407, the control unit 201 controls the connection unit 203 and the like so as to permit and expedite processing of a connection request from the other information input apparatus 102. For example, the control unit 201 changes the internal status to Idle.

Figure 5:
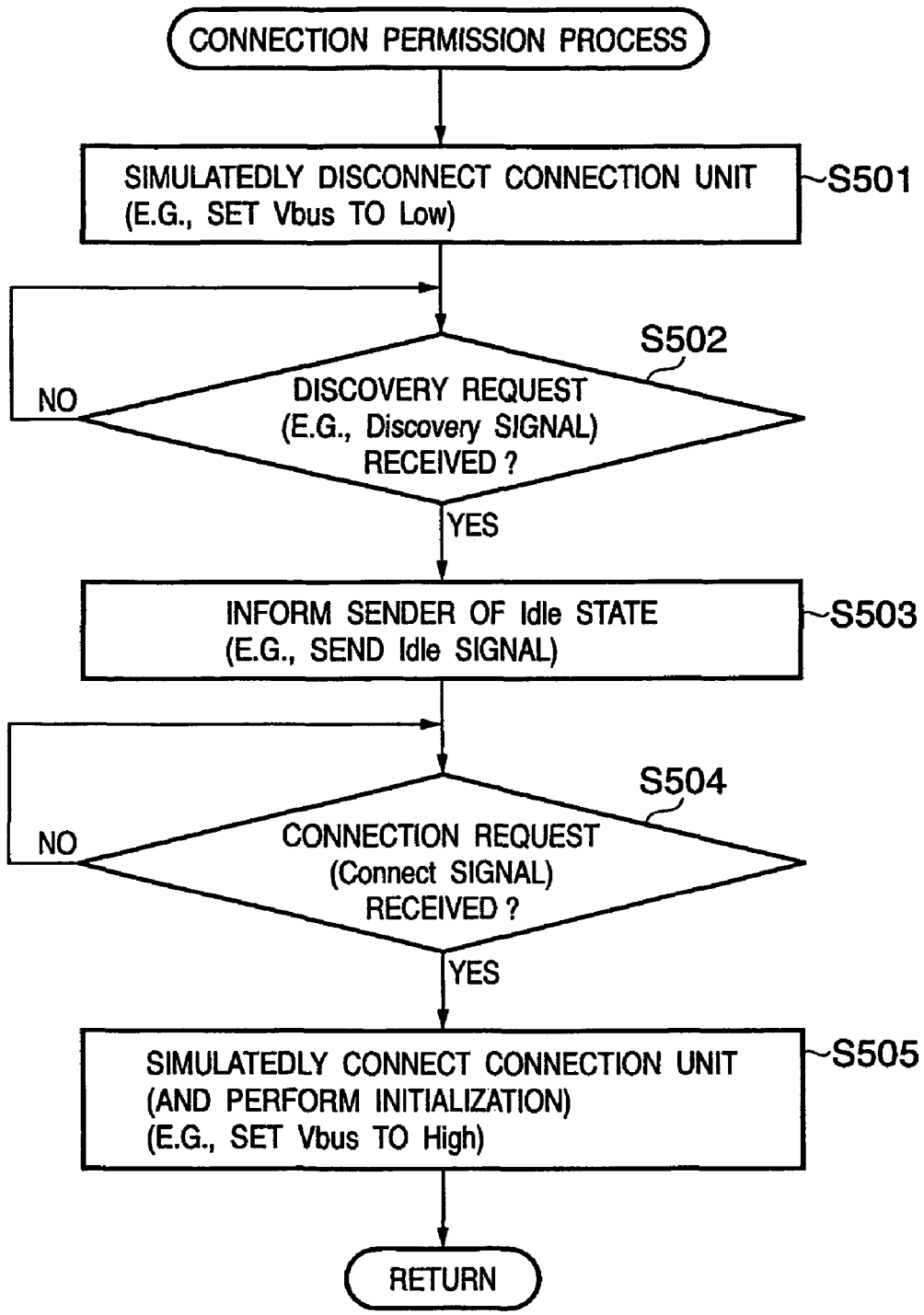
FIG. 5 is an exemplary flowchart showing a connection permission process according to the embodiment.

FIG. 5 is an exemplary flowchart showing a connection permission process according to the embodiment. The flowchart illustrates step S407 described above as a subroutine.

In step S501, the control unit 201 simulatedly disconnects the connection unit 203. For example, if the USB interface is adopted as the connection unit 203, the control unit 201 changes Vbus to Low. The control unit 201 changes the internal status to Idle.

In step S502, the control unit 201 determines whether the wireless communication apparatus 101 has received a discovery request (e.g., a Discovery signal or the like) for the information output apparatus from either of the information input apparatuses through the wireless communication unit 202. If the wireless communication apparatus 101 has received a discovery request, the flow advances to step S503. On the other hand, if the wireless communication apparatus 101 has received no discovery request, the control unit 201 waits for a discovery request to arrive.

In step S503, the control unit 201 informs the information input apparatus having sent the discovery request that the information output apparatus 100 is in an idle state. For example, the control unit 201 unicasts an Idle signal described above.

In step S504, the control unit 201 determines whether the wireless communication apparatus 101 has received a request for connection (e.g., a Connect signal or the like) with the information output apparatus from either of the information input apparatuses through the wireless communication unit 202. If the wireless communication apparatus 101 has received a connection request, the flow advances to step S505. On the other hand, if the wireless communication apparatus 101 has received no connection request, the control unit 201 waits for a connection request to arrive.

In step S505, the control unit 201 simulatedly connects the connection unit 203 with the USB host of the apparatus 100 and performs initialization processing. For example, if the USB interface is adopted as the connection unit 203, the control unit 201 changes Vbus to High. The control unit 201 changes the internal status to Communicating (Busy).

As described above, according to this embodiment, whether the information input apparatus 103 is in a wirelessly communicable state can be recognized at periods shorter than a disconnection waiting (time-out) period defined in the information transfer protocol used for transferring information between the information input apparatus 103 and the information output apparatus 100. The information input apparatus 103 is an apparatus which inputs information to the information output apparatus 100 connected to the connection unit 203 over the wireless network.

This makes it possible for the wireless communication apparatus 101 to recognize an error in the wireless channel more quickly than a conventional method. Upon recognition that the information input apparatus 103 is not in the wirelessly communicable state (the wireless channel is disconnected), the control unit 201 performs control so as to permit and expedite processing of a request for connection with the information output apparatus 100 sent from the other information input apparatus 102 over the wireless network. Accordingly, a waiting time for which the other information input apparatus is kept waiting if the wireless channel is disconnected becomes shorter than a conventional method.

As a method of permitting and expediting processing of such a connection request, there can be adopted, e.g., a method in which the control unit 201 simulatedly and temporarily disconnects connection between the connection unit 203 and the information output apparatus 100 and initializes the connection. This makes it possible for the information output apparatus 100 to suitably end the current processing and prepare for the next processing. For example, if the USB interface is adopted as the connection unit 203, it will suffice that the control unit 201 temporarily sets Vbus to Low and then changes back to High. With this operation, the present invention can be implemented with relative simple processing without changing the configuration of the information output apparatus 100.

Next we assume that it is recognized that the information input apparatus 103 is not in the wirelessly communicable state. In this case, upon receipt of a discovery request for the information output apparatus 100 sent from the other information input apparatus 102, the wireless communication unit 202 informs the information input apparatus 102 that the information output apparatus 100 is in the idle state. With this operation, the other information input apparatus 102 can know that the information output apparatus 100 is in the idle state, and thus, it can immediately send a connection request.

Note that a confirmation signal (Ping signal or the like) for confirming whether the information input apparatus 103 is in the communicable state is sent from the wireless communication unit 202. This makes it possible for the control unit 201 to recognize whether the information input apparatus 103 can perform communication with a relatively simple method.

Second Embodiment

FIG. 6 is an exemplary sequence chart of another wireless communication sequence according to an embodiment. Note that an explanation of parts which are the same as or similar to those in the above-described sequence will be simplified by denoting them with the same reference numerals.

For example, we assume that when an information output apparatus 100 and an information input apparatus 103 are communicating with each other at least partly over a wireless network (S301), the wireless network is disconnected (S306, S307, and S308). At this time, a wireless communication apparatus 101 multicasts a network drop-out notification (S601, S602, and S603). With this operation, the information output apparatus 100 is considered not to exist on the wireless network. Examples of a network drop-out notification include a Bye-Bye signal serving as a disconnection request message in UPnP (Universal Plug and Play). After that, the wireless communication apparatus 101 simulatedly disconnects a connection unit 203 (S309).

The wireless communication apparatus 101 multicasts a network entry notification (e.g., an Alive signal serving as a connection notification message in UPnP or the like) to the wireless network (S604, S605, and S606). With this operation, the information output apparatus 100 is considered to exist on the wireless network. The information output apparatus 100 can process an information output request sent from an information input apparatus within the wireless network.

FIG. 7 is an exemplary flowchart showing a connection permission process according to the embodiment. The flowchart illustrates step S407, described above as a subroutine. Note that an explanation of steps which are the same as or similar to those in the flowchart shown in FIG. 5 will be simplified by denoting them with the same reference numerals.

In step S701, a control unit 201 sends a drop-out notification (e.g., a Bye-Bye signal or the like) indicating a drop-out from the wireless network through a wireless communication unit 202. After that, the control unit 201 simulatedly disconnects the connection unit 203 in step S501, and the flow advances to step S702.

In step S702, the control unit 201 sends an entry notification (e.g., an Alive signal or the like) indicating an entry to the wireless network through the wireless communication unit 202. After that, the control unit 201 performs the processing in step S502 and subsequent steps.

According to this embodiment, the following effects can be obtained, in addition to the same effects as those in the first embodiment. A drop-out notification or entry notification is multicast to a network. This makes it possible to expedite restoration of a wireless network. Accordingly, it becomes possible to make the waiting time of another information input apparatus shorter than a conventional method.

Other Embodiment

The above-described embodiments each have been explained using a wireless network in infrastructure mode as an example. However, the present invention can also be applied to a wireless network in ad hoc mode. This is because the present invention does not, in principle, depend on any type of wireless network.

The embodiments have used terms related to wireless LAN standards such as IEEE802.11. However, this is only intended to facilitate understanding of the present invention. The present invention can, of course, also be applied to other wireless communication standards.

The embodiments each have used, as an example of a case where an information input apparatus 103 becomes unconnectable, a case where a wireless channel established between an access point 104 and the information input apparatus 103 is disconnected. However, the present invention can, of course, also be applied to a case where a wireless channel between a wireless communication apparatus 101 and the access point 104 is disconnected.

The embodiments each have explained a case where Vbus is not set to High for a period from when Vbus is set to Low to when processing of a Connect signal is completed. However, the present invention is not limited to this. For example, there may be used a configuration in which Vbus is set to Low and then set to High immediately after wireless connection between the wireless communication apparatus 101 and the access point 104 is completed.

The embodiments have explained according to a case where PTP/IP is used as a higher level information transfer protocol (application). However, the present invention can also be applied to a wireless communication system in which an information transfer protocol other than PTP/IP is used.

The embodiments have used a Ping signal as an example of connection confirmation. However, the present invention can use various other host applications or programs as far as they can confirm whether a wireless channel is disconnected or not.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention may be implemented by computer, the program code itself installed in the computer can also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments described, but include equivalent means where appropriate, and are defined in the appended claims.

This application claims the benefit of Japanese Application No. 2005-073950, filed on Mar. 15, 2005, which is hereby incorporated by reference herein in its entirety.

What is claimed is:

1. A communication apparatus including:
a wired connection unit that connects to an information processing apparatus over a bus;
a wireless communication unit that communicates with a communication partner of the information processing apparatus over a wireless network;
a confirmation unit that confirms a state of communications between the communication apparatus and the communication partner; and
a change unit that changes a state of a connection between the communication apparatus and the information processing apparatus to a quasi-disconnection state by operating the wired connection unit, depending on a confirmation result obtained by the confirmation unit, to simulate a temporary disconnection between the wired connection unit and the information processing apparatus, and that initializes the connection between the communication apparatus and the information processing apparatus, before a waiting time defined for disconnecting a connection between the communication apparatus and the communication partner has elapsed,
wherein the change unit controls the wired connection unit to change the state of the connection between the communication apparatus and the information processing apparatus to the quasi-connection state, when the wireless communication unit receives, from another communication partner, a connection request for connecting with the information processing apparatus while the confirmation unit confirms that the communication apparatus and the communication partner cannot communicate with each other, and
wherein the change unit is formed at least in part by a computer processor.

2. The communication apparatus according to claim 1, wherein the quasi-disconnection state is a state in which the communication apparatus is physically connected to the information processing apparatus.

3. The communication apparatus according to claim 1, wherein the change unit sets a state of a bus connection between the communication apparatus and the information processing apparatus to the quasi-disconnection state.

4. The communication apparatus according to claim 1, further including a management unit that manages the information processing apparatus in a non-communicating state depending on the confirmation result obtained from the confirmation unit.

5. A communication apparatus that connects with an information processing apparatus, the communication apparatus comprising:
a wired connection unit that connects to the information processing apparatus over a bus;
a wireless communication unit that communicates over a wireless network;

a recognition unit that recognizes whether the communication apparatus is in a state capable of communicating with a communication partner of the information processing apparatus over the wireless network at periods shorter than a disconnection waiting time defined in an information transfer protocol used for transferring information between the communication apparatus and the communication partner; and a control unit that sets a state of a connection between the communication apparatus and the information processing apparatus to a quasi-disconnection state by operating the wired connection unit, to simulate a temporary disconnection between the wired connection unit and the information processing apparatus, and that initializes the connection between the communication apparatus and the information processing apparatus, wherein the control unit controls the wired connection unit to change the state of the connection between the communication apparatus and the information processing apparatus to the quasi-connection state, when the wireless communication unit receives, from another communication partner, a connection request for connecting with the information processing apparatus while the recognizing unit recognizes that the communication apparatus and the communication partner cannot communicate with each other, and wherein the control unit is formed at least in part by a computer processor.

6. The communication apparatus according to claim 5, wherein the wired connection unit is a Universal Serial Bus (USB) interface, and wherein the control unit temporarily sets a bus voltage, Vbus, of the USB interface to Low and then sets Vbus back to High.

7. The communication apparatus according to claim 5, wherein, if the recognition unit recognizes that the communication apparatus cannot communicate with the communication partner, the wireless communication unit informs another communication partner, from which the wireless communication unit receives a discovery request for the information processing apparatus, that the information processing apparatus is in an idle state.

8. The communication apparatus according to claim 5, wherein, if the recognition unit recognizes that the communication apparatus cannot communicate with the communication partner, the wireless communication unit sends a drop-out notification indicating a drop-out from the wireless network and then sends an entry notification indicating an entry to the wireless network.

9. The communication apparatus according to claim 5, wherein the recognition unit sends, via the wireless communication unit to the communication partner, a confirmation signal for confirming whether the information processing apparatus can communicate with the communication partner.

10. A control method performed by a communication apparatus having a wired connection unit connecting to an information processing apparatus over a bus, the method comprising:

communicating with a communication partner of the information processing apparatus over a wireless network;

confirming a state of communications between the communication apparatus and the communication partner; and changing a state of a connection between the communication apparatus and the information processing apparatus to a quasi-disconnection state by operating the wired connection unit, depending on a confirmation result obtained by performing the confirming, to simulate a temporary disconnection between the communication apparatus and the information processing apparatus, and initializing the connection between the communication apparatus and the information processing apparatus, before a waiting time defined for disconnecting a connection between the communication apparatus and the communication partner has elapsed, wherein the state of the connection between the communication apparatus and the information processing apparatus is changed to the quasi-connection state, when a connection request for connecting with the information processing apparatus is wirelessly received from another communication partner while the state of communications between the communication apparatus and the communication partner is confirmed to be a state in which the communication apparatus and the communication partner cannot communicate with each other.

11. A control method performed by a communication apparatus including a wired connection unit connecting to an information processing apparatus over a bus, and a wireless communication unit for the information processing apparatus to perform communications over a wireless network, the method comprising:

recognizing whether the communication apparatus is in a state capable of communicating with a communication partner of the information processing apparatus over the wireless network at periods shorter than a disconnection waiting time defined in an information transfer protocol used for transferring information between the communication apparatus and the communication partner; and setting a state of a connection between the communication apparatus and the information processing apparatus to a quasi-disconnection state by operating the wired connection unit, to simulate a temporary disconnection between the communication apparatus and the information processing apparatus, and initializing the connection between the communication apparatus and the information processing apparatus, wherein the state of the connection between the communication apparatus and the information processing apparatus is changed to the quasi-connection state, when a connection request for connecting with the information processing apparatus is wirelessly received from another communication partner while the state of communications between the communication apparatus and the communication partner is recognized to be a state in which the communication apparatus and the communication partner cannot communicate with each other.

12. A non-transitory computer-readable storage medium having stored thereon a computer-executable control program that, when executed by a communication apparatus, causes the communication apparatus to perform a method of connecting to an information processing apparatus over a bus, the method comprising:

communicating with a communication partner of the information processing apparatus over a wireless network;

confirming a state of communications between the communication apparatus and the communication partner; and changing a state of a connection between the communication apparatus and the information processing apparatus to a quasi-disconnection state by operating the wired connection unit, depending on a confirmation result obtained by performing the confirming, to simulate a temporary disconnection between the communication apparatus and the information processing apparatus, and initializing the connection between the communication apparatus and the information processing apparatus, before a waiting time defined for disconnecting the connection between the communication apparatus and the communication partner has elapsed, wherein the state of the connection between the communication apparatus and the information processing apparatus is changed to the quasi-connection state, when a connection request for connecting with the information processing apparatus is wirelessly received from another communication partner while the state of communications between the communication apparatus and the communication partner is confirmed to be a state in which the communication apparatus and the communication partner cannot communicate with each other.

13. A non-transitory computer-readable storage medium having stored thereon a computer-executable control program that, when executed by a communication apparatus, causes the communication apparatus to perform a method of connecting to an information processing apparatus, the method comprising:

recognizing whether the communication apparatus is in a state capable of communicating with a communication partner of the information processing apparatus over a wireless network at periods shorter than a disconnection waiting time defined in an information transfer protocol used for transferring information between the communication apparatus and the communication partner; and setting a state of a connection between the communication apparatus and the information processing apparatus to a quasi-disconnection state by operating the wired connection unit, to simulate a temporary disconnection between the communication apparatus and the information processing apparatus, and initializing the connection between the communication apparatus and the information processing apparatus, wherein the state of the connection between the communication apparatus and the information processing apparatus is changed to the quasi-connection state, when a connection request for connecting with the information processing apparatus is wirelessly received while the state of communications between the communication apparatus and the communication partner is recognized to be a state in which the communication apparatus and the communication partner cannot communicate with each other.

14. The communication apparatus according to claim 1, wherein the confirmation unit confirms the state of communication with the communication partner at intervals shorter than a data delay time-out period defined in the information transfer protocol used for communication with the communication partner.

15. The communication apparatus according to claim 1, wherein the wireless communication unit informs that the information processing apparatus is ready to use, when the wireless communication unit receives, from another communication partner, a discovery request for discovering the information processing apparatus while the confirmation unit confirms that the communication apparatus and the communication partner cannot communicate with each other.

16. The communication apparatus according to claim 1, wherein the wireless communication unit sends a drop out notification for dropping out from the wireless network, when the confirmation unit confirms that the communication apparatus and the communication partner cannot communicate with each other, and wherein the wireless communication unit sends an entry notification indicating an entry to the wireless network after the change unit changes the state of the connection between the communication apparatus and the information processing apparatus to the quasi-disconnection state.

17. A communication adaptor comprising:

a bus connection unit that connects to a peripheral device over a bus;

a wireless communication unit that communicates with a communication partner of the peripheral device over a wireless network, the communication partner being another peripheral device and/or a computer;

a transferring unit that transfers information received from the peripheral device via the bus connection unit to the communication partner via the wireless communication unit, and transfers information received from the communication partner via the wireless communication unit to the peripheral device via the bus connection unit;

a confirmation unit that confirms a state of communications between the communication adaptor and the communication partner, and a change unit that changes a state of a connection between the communication adaptor and the peripheral device to a quasi-disconnection state by operating the wired connection unit, depending on a confirmation result obtained by the confirmation unit, to simulate a temporary disconnection between the bus connection unit and the peripheral device, and that initializes the connection between the communication adapter and the peripheral device, before a waiting time defined for disconnecting the connection between the communication adapter and the communication partner has elapsed, wherein the change unit controls the wired connection unit to change the state of the connection between the communication adapter and the peripheral device to the quasi-connection state, when the wireless communication unit receives, from another communication partner, a connection request for connecting with the peripheral device while the confirmation unit confirms that the communication adapter and the communication partner cannot communicate with each other, and wherein the change unit is formed at least in part by a computer processor.

* * * * *